July 16, 1957
G. C. WILSON
2,799,049
INJECTION MOLDING MACHINE
Filed June 7, 1952
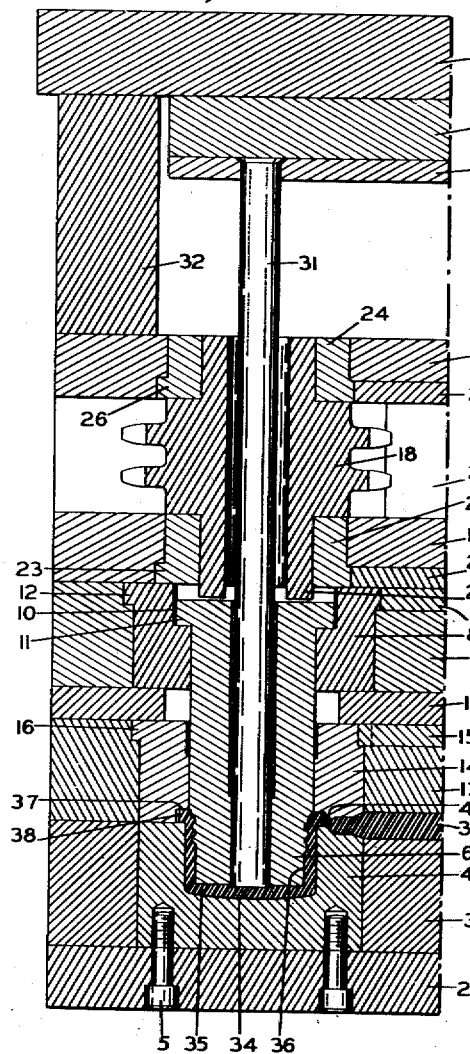
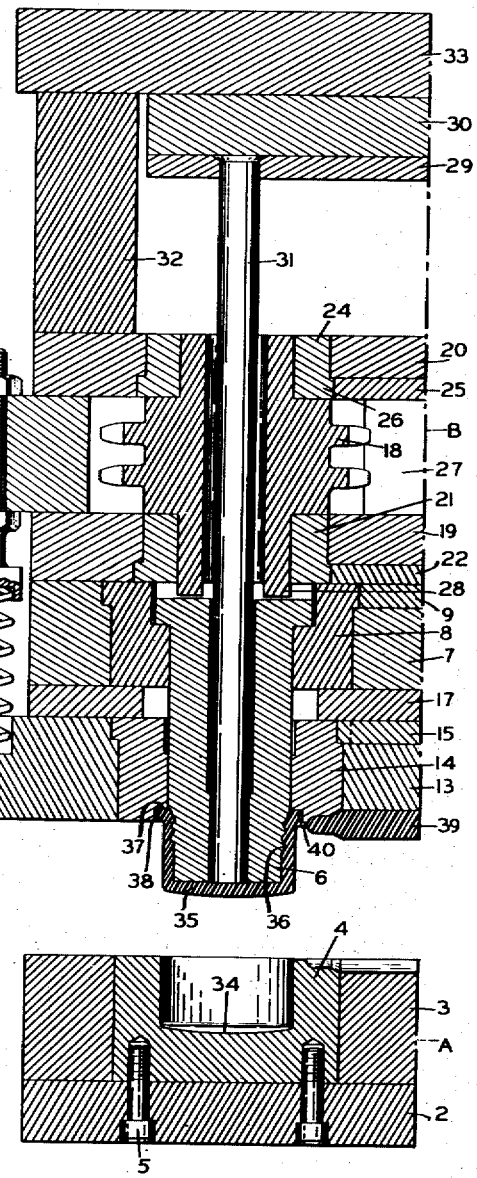
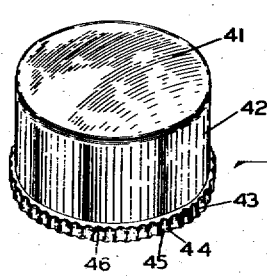
INVENTOR
GARDINER C. WILSON
ATTORNEY United States Patent Office 2,799,049
Patented July 16, 1957

2,799,049
INJECTION MOLDING MACHINE

Gardiner C. Wilson, Mountville, Pa., assignor to Armstrong Cork Company, Lancaster, Pa., a corporation of Pennsylvania Application June 7, 1952, Serial No. 292,273

3 Claims. (Cl. 18—30)

The present invention relates to an injection molding machine and is concerned particularly with an injection molding machine for forming an internally threaded article with a pin-point gate. Typical of the articles which may be produced on the machine of the present invention are internally screw threaded closures of the type customarily used in sealing bottles and other containers.

In the injection molding of screw threaded articles, common practice has been to rely upon the sprue runner and gate to hold the molded article against rotation as the force die is rotated to unscrew the article therefrom. With the advent of pin-point gating, such arrangements can no longer be relied upon, for the gate is of such small cross-sectional area that it has inadequate strength to resist the turning torque incurred in unscrewing the article from the force die.

It is an object of the present invention to provide an injection molding machine for forming internally threaded articles with a pin-point gate including means for holding the article against rotation during the unscrewing of the force die.

Another object of the invention is to provide an injection molding machine for forming internally threaded articles with a pin-point gate in which the gate enters the article in a zone where the same is substantially fully concealed from view upon completion of the molding of the article and removal of the sprue runner and gate therefrom, eliminating the need for grinding or otherwise finishing the surface of the article in the area where the gate has been broken away from the article.

Other objects of the invention will become apparent from consideration of the following description of a preferred embodiment of the invention which is illustrated in the attached drawing, in which:

Figure 1 is a sectional view of a portion of an injection molding die set for the manufacture of screw threaded closures, showing the molding dies in closed position;

Figure 2 is a view similar to Figure 1 (with the addition of an arrangement for applying axial force to the ejector plate) showing the molding dies in open position ready for discharge of the molded article therefrom; and Figure 3 is a perspective view of a completed screw threaded closure formed in the dies of Figure 1 and 2 and illustrating to an exaggerated scale the remains of the pin-point gate thereon.

The molding dies shown in Figures 1 and 2 are of generally conventional construction in that they include a cavity die unit and a force die unit, the latter unit including a force die ejector plate which may be spring urged to apply axial force to the molded article during unscrewing of the article from the force die as shown diagrammatically in Fig. 2. The general arrangement is illustrated and described in my Patent 2,558,027. However, in the present dies there is no need for the counter-balancing spring arrangement for the force die ejector plate of my prior patent. In the portion of the molding dies shown in the drawing one closure is being formed; it is to be understood, however, that multiple dies will normally be included in the die set, the number of units depending upon the size of the closures or other articles being formed, the quantity to be made, and other factors.

The device comprises a cavity die unit A and a force die unit B, Figure 2.

The cavity die unit comprises a cavity die backing plate 2, a cavity die chase plate 3, and a cavity die 4. The cavity dies are usually formed as separate pieces and are fitted into the cavity die chase plate and held in place by screws 5 which pass through the cavity die backing plate and into the body of the cavity dies. The cavity die unit is generally fixed, and the force die unit is movable toward and away from the cavity die unit into molding position, as shown in Figure 1, and from such position to an unscrewing and discharge position as shown in Figure 2.

The force die unit comprises a force die 6 which passes through a force die chase plate 7 in which is received a force die sleeve 8 held in place against rotation in the force die chase plate 7 by a force die sleeve key 9. The force die sleeve 8 is recessed at 10 to receive an annular flange 11 of the force die 6 to position the force die and permit its rotation, as will be more fully hereinafter described. The force die sleeve 8 is provided with a radial flange 12 which is received within a complementary recess in force die chase plate 7. Positioned below the force die chase plate 7 is an ejector plate 13 which is preferably formed to receive an ejector sleeve 14 therein, the same being held against rotation by an ejector sleeve key 15. The ejector sleeve is provided with a radial flange 16 which fits within a complementary recess in ejector plate 13 to hold the ejector sleeve in proper position. An ejector backing plate 17 is disposed over ejector plate 13 and below force die chase plate 7.

Means are provided for rotating the force die 6. In the embodiment shown, this comprises a force die sprocket 18 which is journaled for rotation in a force die backing plate 19 and a sprocket shaft plate 20. A bearing bushing 21 is provided in backing plate 19 and is held against rotation by a key 22. The bushing 21 is provided with a radial flange 23 which is received within a complementary recess in backing plate 19. A similar bushing 24 is provided in sprocket shaft plate 20, and it also is provided with a key 25 and a radial flange 26 which is received within a complementary recess in sprocket shaft plate 20. A spacer plate 27 is positioned between backing plate 19 and sprocket shaft plate 20. The lower end of the hub sprocket 18 is provided with projections 28 which are disposed within a recess which extends diametrically across the top of force die 6. Thus rotation of the sprocket 18 will effect rotation of the force die 6.

A knockout arrangement is preferably provided including a knockout plate 29, a knockout backing plate 30, and a knockout pin 31 secured to the knockout plate and passing through the sprocket 18 and force die 6 where, during molding, it lies at the outer surface of the force die as shown. This position is fixed by knockout spacers 32 (only one is shown in the drawing) which are positioned between sprocket shaft plate 20 and a mounting plate 33. Conventional mechanism is provided for moving the ejector in the manner to be described later.

All of the members above the force die chase plate 7 and including that plate are carried by the mounting plate 33, the knockout members 29—31 being movable with respect to the mounting plate 33, however, and the force die 6 and sprocket 18 being rotatable within their mountings.

The ejector plate 13 and its associated sleeves 14 and keys 15 are secured to backing plate 17, and this assemblage is mounted for limited movement axially of force die 6 when the mold members are parted. It is customarily spring urged (as by means of spring *s* shown in Figure 2) toward an extended position.

When the members are disposed in the position shown in Figure 1, a molding cavity is formed. This is defined by the inner surface 34 of cavity die 4 which forms the major portion of the outer surface of an article 35, shown within the molding cavity, by the outer surface 36 of force die 6 which forms the screw-threaded, inner surface of the article 35, and by a forming surface 37 which in the embodiment shown is in the nature of an annular surface having radial projections 38 formed therein, each of which extends axially of the mold cavity. To provide for the injection of molding composition into the molding cavity, a sprue runner 39 is formed in the cavity die or the ejector plate or both, and a small or pin-point gate 40 leads from the sprue runner into the molding cavity. A pin-point gate should be from 0.0002 to 0.001 square inch in area, depending upon the size of the molding, the number of cavities, the type of material being molded, and other variable factors. In the illustrated structure, the runner is formed in the cavity die and cavity die chase plate and in the ejector plate and ejector sleeve. The pin-point gate is formed in the ejector sleeve at the base of and between a pair of adjacent projections 38. It may be partially formed in both ejector sleeve and cavity die or in the cavity die alone. Preferred practice, of course, is to form the runner and gate in the parting surfaces of the dies.

The device is illustrated with molding dies for producing a bottle closure having an internal screw thread for engagement with a complementary screw thread formation on a container, such as a glass bottle. The closure is illustrated in Figure 3 and has a top 41, a skirt 42, and an annular knurled rim 43, with the knurls formed of alternate raised ribs 44 and depressions 45 defined by the radial projections 38 formed in the ejector sleeve portion of the molding cavity. The zone of the pin-point gate has been indicated by a dot numbered 46, but actually it is almost imperceptible to the unaided eye.

In the operation of the device, the cavity die unit A and the force die unit B are moved to closed position as shown in Figure 1. Melted thermoplastic molding composition is delivered from a charging sprue and delivered under pressure through sprue runner 39 and gate 40 into molding cavity 34. After filling of the cavity has been completed, the mass of molding material is permitted to cool and thereby harden. Thereupon the dies are parted and the parts assume the position shown in Figure 2. The sprocket 18 is then rotated in the conventional manner, and a counterclockwise rotation is imparted to threaded force die 6. Ejector plate 13, being yieldingly urged toward an extended position, moves the formed article (together with the sprue and sprue runner) axially of the force die as unscrewing of the force die continues. When complete unscrewing of the cap from the force die has been effected, knockout pin 31 is moved axially within the force die 6 and serves to strip the molded article from within the ejector sleeve where it is frictionally held by interengagement with the molding surfaces thereof. Rotation of the article during unscrewing is prevented by the radial projections 38 formed in the ejector sleeve. The gate 40 is preferably so small in cross sectional area that the article will break away therefrom when it falls into a suitable receptacle positioned to receive the ejected articles, sprue, and runners, or may be broken free by merely grasping the sprue and shaking the articles therefrom.

I claim:

1. In an injection molding machine for forming an internally threaded article with a pin-point gate, the combination of a cavity die having an internal molding surface for forming a portion of the outer surface of a threaded article, a rotatable force die having an external molding surface for forming the inner threaded surface of the threaded article, an axially movable force die ejector associated with and surrounding the force die and having a recessed annular molding surface for forming the complete lower edge of the skirt of the article and cooperating with the cavity die to form a radially projecting annular bead on the lower edge of the outer periphery of the skirt of the article where it intersects said lower edge portion of the skirt, said cavity die and said force die parting along the line of intersection of said bead with the wall of said skirt, said dies together with the associated force die ejector being relatively movable to form a molding cavity when said dies are closed and to permit unscrewing of said force die and removal of a formed article when said dies are parted, at least one of said cavity die and force die ejector having a channel therein extending to a pin-point gate opening into said molding cavity for the delivery of molding material into said molding cavity when said dies are closed, means for rotating said force die upon parting of said dies to unscrew a molded article from said die, means on the outer periphery of the recessed annular molding surface of the force die ejector projecting radially into said molding cavity and extending generally axially of said annular molding surface to interlock with said molded article to prevent rotation of said molded article during rotation of said force die is unscrewing of the article therefrom and to permit stripping of the article from the force die ejector in a generally axial direction after unscrewing of the article from the force die, means for urging said force die ejector axially of said force die during rotation of said force die to release said molded article from said force die while said article is held in interlocked relationship with said force die ejector, and means passing through said force die for engagement with said molded article released from said force die to release said molded article from its interlocked relationship with said force die ejector.

2. In an injection molding machine for forming an internally threaded article with a pin-point gate, the combination of a cavity die having an internal molding surface for forming a portion of the outer surface of a threaded article, a rotatable force die having an external molding surface for forming the inner threaded surface of the threaded article, an axially movable force die ejector associated with and surrounding the force die and having a recessed annular molding surface for forming the complete lower edge of the skirt of the article and cooperating with the cavity die to form a radially projecting annular bead on the lower edge of the outer periphery of the skirt of the article where it intersects said lower edge portion of the skirt, said cavity die and said force die parting along the line of intersection of said bead with the wall of said skirt, said dies together with the associated force die ejector being relatively movable to form a molding cavity when said dies are closed and to permit unscrewing of said force die and removal of a formed article when said dies are parted, at least one of said cavity die and force die ejector having a channel therein extending to a pin-point gate opening into the side wall of said molding cavity substantially at the line of intersection of said cavity die and force die ejector for the delivery of molding material into said molding cavity when said dies are closed, means for rotating said force die upon parting of said dies to unscrew a molded article from said force die, a plurality of ribs on the outer periphery of the recessed annular molding surface of the force die ejector projecting radially into said molding cavity and extending generally axially of said annular molding surface to interlock with said molded article to prevent rotation of said molded article during rotation of said force die in unscrewing of the article therefrom and to permit stripping of the article from the force die ejector in a generally axial direction after unscrewing of the article from the force die, means for urging said force die ejector axially of said force die during rotation of said force die to release said molded article from said force die while said article is held in interlocked relationship with said force die ejector, and means passing through said force die for engagement with said molded article released from said force die to release said molded article from its interlocked relationship with said force die ejector.

3. In an injection molding machine for forming an internally threaded article with a pin-point gate, the combination of a cavity die having an internal molding surface for forming a portion of the outer surface of a threaded article, a rotatable force die having an external molding surface for forming the inner threaded surface of the threaded article, an axially movable force die ejector plate, a force die ejector sleeve secured to the force die ejector plate and surrounding the force die, said sleeve having a flat surface for engagement with said cavity die surrounding the opening therein and an annular recess extending from said flat surface to the opening in said sleeve surrounding the force die, said recess forming a radially projecting annular molding cavity which forms the complete lower edge of the skirt of the article and which cooperates with said cavity die to form a radially projecting annular bead on the lower edge of the outer periphery of the skirt of the article where it intersects said lower edge portion of the skirt and to form the complete outer surface of the molded article, said cavity die and said force die parting along the line of intersection of said bead with the wall of said skirt, a plurality of ribs projecting radially inwardly from the outer wall of said force die ejector sleeve molding cavity and extending generally axially thereof to interlock with said molded article to prevent rotation of said molded article during rotation of said force die in unscrewing of the article therefrom and to permit stripping of the article from the force die ejector sleeve in a generally axial direction after unscrewing of the article from the force die, means for urging said force die ejector plate and sleeve axially of said force die during rotation of said force die to release said molded article from said force die while said article is held in interlocked relationship with said force die ejector sleeve, said dies having a pin-point gate opening into said molding cavity, and means passing through said force die for engagement with said molded article released from said force die to axially strip the unscrewed molded article from its interlocked relationship with said force die ejector sleeve.

References Cited in the file of this patent
UNITED STATES PATENTS

| | | |
|---|---|---|
| 1,944,571 | Rahm | Jan. 23, 1934 |
| 2,217,661 | Anderson | Oct. 15, 1940 |
| 2,306,205 | Crosman | Dec. 22, 1942 |
| 2,317,823 | Strauss | Apr. 27, 1943 |
| 2,339,443 | Wilson | Jan. 18, 1944 |

UNITED STATES PATENT OFFICE

CERTIFICATE OF CORRECTION

Patent No. 2,799,049                               July 16, 1957

Gardiner C. Wilson

It is hereby certified that error appears in the printed specification of the above numbered patent requiring correction and that the said Letters Patent should read as corrected below.

Column 1, line 57, for the word "Figure" read -- Figures --; column 2, line 48, after the word "hub" insert -- of --; column 4, line 17, after "said", second occurrence, insert -- force --; line 23, for "die is unscrewing" read -- die in unscrewing --.

Signed and sealed this 3rd day of September 1957.

(SEAL)

Attest:

KARL H. AXLINE
Attesting Officer

ROBERT C. WATSON
Commissioner of Patents